United States Patent [19]

Murphy

[11] 3,795,500
[45] Mar. 5, 1974

[54] EXTRACTION OF GASES FROM THE MOLTEN BATH OF A FLOAT GLASS OPERATION

[76] Inventor: Norman Aidan Murphy, Liverpool, England

[22] Filed: Sept. 21, 1971

[21] Appl. No.: 182,443

Related U.S. Application Data

[63] Continuation-in-part of Ser. No. 800,568, Feb. 19, 1969, abandoned.

[52] U.S. Cl. .............................. 65/99 A, 65/182 R
[51] Int. Cl. ........................................... C03b 18/02
[58] Field of Search.............. 65/99 A, 182 R; 55/55

[56] References Cited
UNITED STATES PATENTS

| | | | |
|---|---|---|---|
| 3,615,316 | 10/1971 | Kita | 65/99 A X |
| 3,428,444 | 2/1969 | Swillinger | 65/182 |
| 3,520,669 | 7/1970 | Greenler | 65/27 |
| 3,583,859 | 6/1971 | Lawrenson et al. | 65/99 A X |
| 3,489,543 | 1/1970 | Kita et al. | 65/182 RX |

*Primary Examiner*—S. Leon Bashore
*Assistant Examiner*—Kenneth M. Schor

[57] ABSTRACT

In the float process for glass manufacture, gases are extracted from the molten metal bath by applying suction to a removable body of porous nonmetallic refractory material, for example graphite or aluminosilicate refractory, which is immersed in the bath alongside the path of the glass ribbon.

8 Claims, 4 Drawing Figures

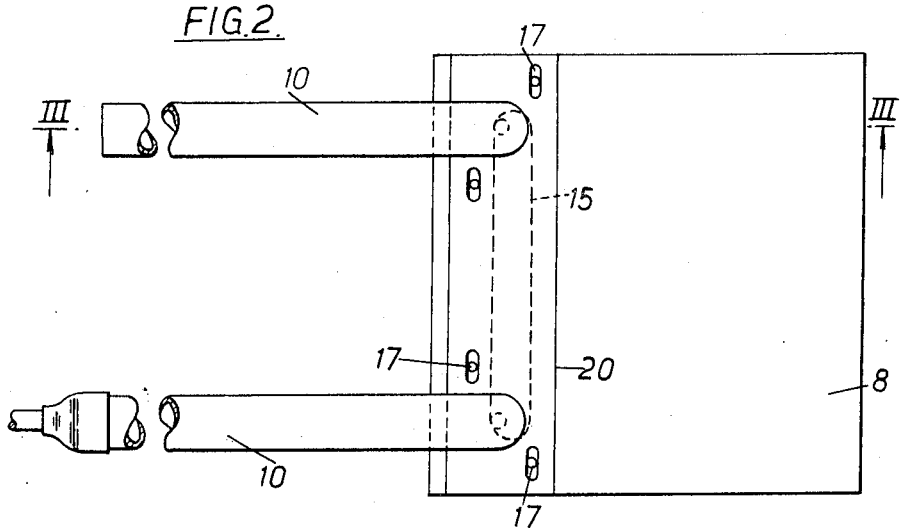
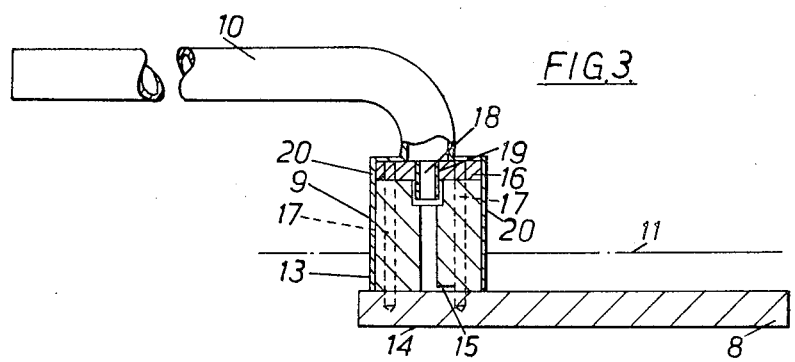
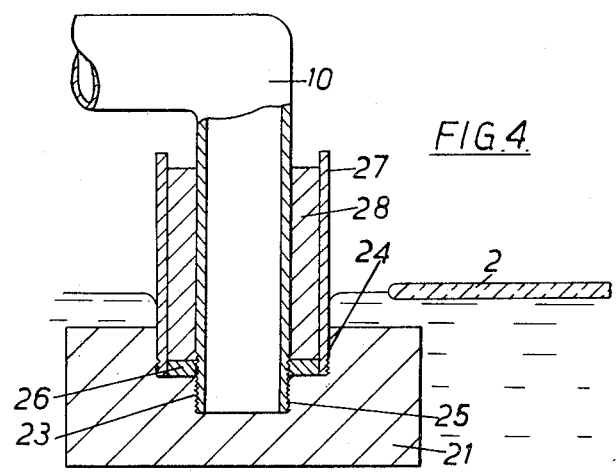

EXTRACTION OF GASES FROM THE MOLTEN BATH OF A FLOAT GLASS OPERATION

CROSS REFERENCE TO RELATED APPLICATION

This application is a continuation-in-part of application Ser. No. 800,568 filed Feb. 19, 1969 now abandoned.

BACKGROUND OF THE INVENTION

This invention relates to the extraction of gases from a molten metal bath.

The invention has particular application to the extraction of gases from a bath of molten metal as employed in the float process for flat glass manufacture, in which glass is brought into contact with the upper surface of a molten metal bath, either during the formation of the glass in a specific ribbon form, or in the course of surface treatment of the float ribbon. The molten metal bath may be so constituted as to have all the characteristics fully described in U.S. Pat. No. 3,083,551, namely:

1. Melting point below 700°C approximately.
2. Boiling point above 1,000°C.
3. Metal must be denser than glass.
4. Metal must not stick to glass or react chemically with it to any great extent.

Preferably the bath is a bath of molten tin or of a molten tin alloy in which tin predominates.

It is important to avoid the formation of gaseous bubbles in the molten metal bath as such bubbles may rise through the bath and impinge on the lower surface of the glass, marring this surface. The surface defect caused by bubbles in this way is commonly known as "bottom bubble."

The molten metal bath used in glass manufacture is commonly contained in a tank structure having a refractory lining. In the course of time, soda from the glass in contact with the bath migrates to the tank lining and forms a glassy coating thereon. It is believed that such glaze on the tank lining provides nucleation points for the formation of gaseous bubbles, notably of hydrogen, which bubbles, upon reaching a sufficiently large size, become detached from the lining and rise through the bath. This formation of gaseous bubbles has been inhibited by applying suction to the tank lining refractory; but in some circumstances of operation glazing of the refractory lining may render the refractory lining impervious, and it becomes increasingly difficult to draw gases from the lining by suction.

SUMMARY

According to the present invention a method of extracting gases from a molten bath comprises immersing a removable body of porous non-metallic refractory material in the bath and applying suction directly to said body to withdraw gases from the bath through the body.

By applying suction to a body of porous refractory material which is immersed in the molten metal while being separated from the tank structure or its lining, the body to which suction is applied can be replaced as and when this becomes necessary.

BRIEF DESCRIPTION OF THE DRAWINGS

FIG. 2 is a detailed plan view of one of the suction heads of FIG. 1;

FIG. 3 is a part-section on line III—III of FIG. 2; and

FIG. 4 is a view similar to FIG. 3 of another suction head shown immersed in a molten metal bath.

DESCRIPTION OF THE PREFERRED EMBODIMENT

Figure 1:
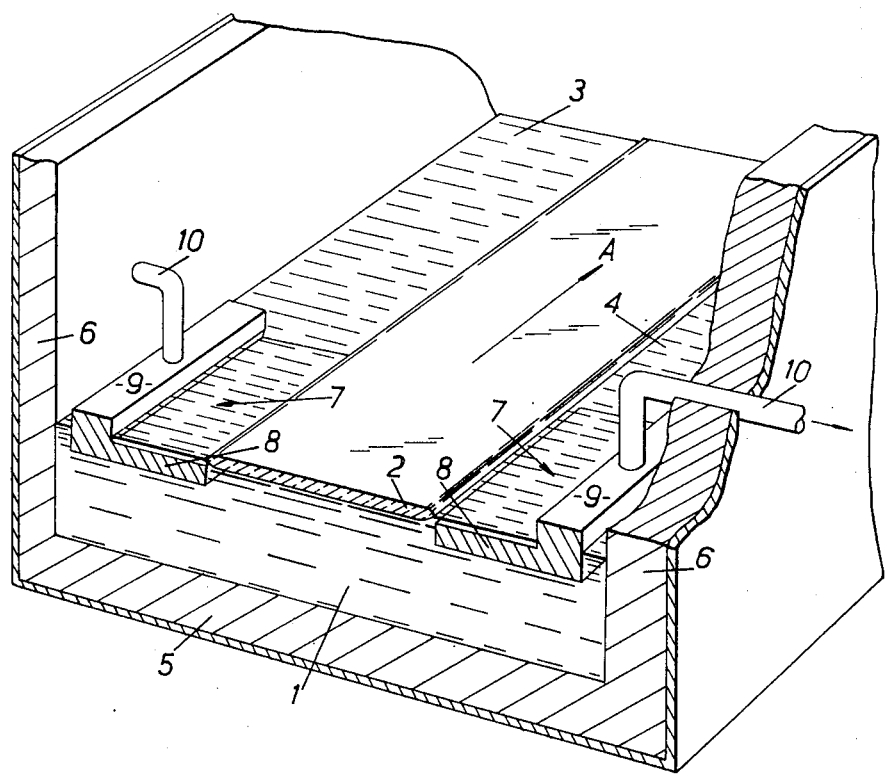
FIG. 1 is a diagrammatic perspective view of part of a float glass manufacturing apparatus including suction heads according to the invention.

In the illustrated embodiment molten glass is delivered to one end of a bath 1 of molten tin and advanced in ribbon form along the surface of the bath towards the other end thereof. The glass is supplied to the bath at a controlled rate so that an advancing layer of molten glass is formed on the surface of the bath 1 and flows laterally outwardly to form a ribbon 2 of uniform width less than the surface width of the bath 1 which is contained in an elongated tank structure. Thus as the ribbon 2 is advanced along the surface of the bath 1, in the direction of arrow A in the drawing, two marginal areas 3, 4 of the surface of the bath 1 are exposed on each side of the ribbon 2 to a protective atmosphere in the headspace defined by a roof structure, not shown, over the bath. The headspace is supplied continuously with a protective gas, for example, nitrogen with 5 percent hydrogen in order to maintain the protective atmosphere at a plenum over the bath.

The temperature of the glass ribbon 2 is controlled as it is advanced along the bath 1 by means of temperature regulators, not shown, disposed in the bath 1 and in the headspace over the bath 1 so that the glass is sufficiently cool when it reaches the other end of the bath 1 to be removed unharmed in ribbon form from the surface of the bath for transfer to an annealing lehr.

As shown diagrammatically the tank structure containing the bath 1 has a floor 5 and integral side walls 6 formed by respective refractory linings on a metal shell. To prevent the formation of bubbles, e.g. of hydrogen, in the molten metal of the bath, suction is applied to the bath 1 by means of suction heads 7, two only of which are shown, immersed in the molten metal of the bath 1.

In the illustrated embodiment the suction heads 7 are partially immersed in the marginal areas 3, 4 of the bath 1 on opposite respective sides of the ribbon 2. Each suction head 7 comprises a body of porous non-metallic refractory material having a plate-shaped portion 8 which is immersed beneath the surface of the bath 1 and an exposed connecting portion 9 which extends upwardly above the surface of the bath 1. The exposed portion 9 has a surface glaze to render it impermeable. One or more suction lines 10 passes through the impermeable surface of the exposed portion 9 to communicate with the immersed portion 8. Only one suction line 10 is shown. The suction line 10 is preferably sealed into the surface glaze by means of glass frit, and passes outwardly through the respective side wall 6 of the tank structure to a suction pump 11 common to all the suction heads 7. The suction pump may be of any convenient type, and is preferably an ejector-type pump. A pressure of about $10^{-2}$ mm of mercury is maintained in the suction line 10.

In operation of the apparatus gases are withdrawn from the molten metal of the bath 1 through the immersed portions 8 of the suction heads 7 and in this way the formation of bubbles in the bath 1 is prevented or inhibited.

One of the suction heads 7 is illustrated in greater detail in FIGS. 2 and 3, and comprises a plate 8 of porous graphite material, 12 inches square, which is immersed in the molten metal bath 1. The surface level of the bath is indicated at 11 in FIG. 3.

A rectangular block 9, also of porous graphite material, is cemented to the upper surface of the plate 8 near to one edge of the plate, using a cement of sodium silicate mixed with powdered graphite.

The block 9 is formed with two suction bores 13 extending down through the block to the cemented interface 14 between the block 9 and the plate 8. An elongated recess 15 is cut in the lower face of the block 9, and is carefully kept free from cement. This recess assists in distributing suction over and through the porous plate 8.

A plate 16 of heat resisting steel is secured to the top surface of the block 9 by means of steel bolts 17 which extend through bores in the block 9 and are screwed down into tapped bores in the plate 8.

The plate 16 has two suction apertures 18 in each of which there is welded a steel sleeve 19 which fits into a widened diameter upper end of the bore 13. A suction line 10 is welded to the upper face of the plate 16 over each suction aperture 18. The whole suction head is held in position by the suction lines 10.

When the whole has been assembled, a surface glaze of sodium silicate and powdered graphite, indicated at 20, is applied over the outside of block 9 to seal the block so that when suction is applied to the lines 10, only gases from the molten bath are drawn into the head.

Preferably the plate 8 and the block 9 are all made of the same porous graphite material having an open porosity of 18 to 25 percent with the majority of the pores not being greater than 2 microns in diameter.

For example one of the following materials may be used:
a. Premium Grade CGW National Graphite
  apparent density 1.8 g/cc
  average maximum grain size 150 microns
  porosity 18 to 20 percent
  pore size — majority in the range 2 to 4 microns
b. Premium Grade CMB National Graphite
  apparent density 1.76 g/cc
  average maximum grain size 75 microns
  porosity 20 to 22 percent
  pore size — majority in the range 2 to 4 microns
Alternatively alumino-silicate refractory materials may be used, for example:
c. Australian Consolidated Industries Claycast 1181 chemical composition:

$SiO_2$ — 61.8 percent $Al_2O_3$ — 33.3 percent $Fe_2O_3$ — 1.0 percent $TiO_2$ — 1.0 percent $CaO$ — 0.04 percent $MgO$ — 0.04 percent $Na_2O$ — 0.09 percent $K_2O$ — 0.7 percent pore sizes range up to 5 microns with the majority in the range 1 to 2 microns.
d. Finlay H.M. Debitense Block
  chemical composition:

$SiO_2$ — 71.6 percent $Al_2O_3$ — 25.2 percent $TiO_2$ — 1.08 percent $Fe_2O_3$ — 0.86 percent $CaO$ — 0.23 percent $MgO$ — 0.21 percent Alkalies 0.58 percent porosity 28 percent
  pore size in the range 0.2 microns to 2 microns with the majority at 0.5 microns.

Another kind of suction head according to the invention is illustrated in FIG. 4. The removable porous body is a block 21 of any one of the above-mentioned materials (a) to (d). One of the porous graphite materials is usually preferred.

A blind bore of stepped diameter is formed downwardly into the block 21 from its upper surface 22, this bore consisting of a sunk central part 23 and a wider upper part 24. Both parts 23 and 24 of the bore are tapped.

The end 25 of the suction line 10 is threaded and is screwed into the central part 23 of the bore. A ring 26 of heat resisting steel is screwed onto the end 25 of the suction line, and an outer sleeve 27 of sillimanite, glazed with sodium silicate is screwed into the upper part 24 of the bore. The sillimanite sleeve 27 is formed with an appropriate thread on its lower outer face.

The interspace between the suction line 10 and the sleeve 27 is filled with crushed glass, usually ordinary soda-lime-silica glass of the same composition as the float ribbon 2, and when the block 21 is in position immersed in the molten metal bath alongside and just beneath the path of travel of the ribbon of glass, the crushed glass in the interspace melts to form a seal 28.

Suction is then applied and the whole of the surface of the block 21 exposed to the molten metal of the bath is effective to draw gases from the molten metal bath.

In the above described embodiments and methods of operation, the stated porosity of the non-metallic refractory material which is used is such that gases only are drawn into the refractory and there are no difficulties caused by clogging of the pores of the material by metal of the bath.

The continuous extraction of gases from the molten metal bath, especially dissolved hydrogen, established a dissolved gas concentration gradient across the bath underneath the ribbon of glass so that saturation concentration of dissolved gas in the molten metal is never reached and the so-called "bottom bubble" is avoided.

The suction heads 7 are in practice spaced apart at intervals along the length of the bath 1. Since gas bubbles are more prone to be formed in the hotter end of the bath 1, the distribution of the heads 7 in the bath 1 is preferably denser towards the hotter end of the bath. Also, the heads 7 may extend well beneath the part of the bath surface on which the glass ribbon 2 floats to enhance the extraction of gases, particularly at the hotter end of the bath 1.

To improve the efficiency of the suction heads 7 they may be inserted in the bath 1 in close proximity to circulatory pumps (not shown) for circulating the molten metal in the bath 1.

I claim:

1. In the method of manufacturing float glass in which a ribbon of glass is advanced along a bath of molten metal over which a protective atmosphere is maintained, the improvement comprising extracting gases from the molten metal bath by immersing in the bath alongside the ribbon of glass at least a portion of a removable body which is separated from the tank side walls and the tank floor, with at least said immersed portion being of a porous non-metallic, refractory material, rendering the surface of any portion of said body not so immersed and exposed to the atmosphere over the molten metal bath impermeable to said atmosphere, and applying suction directly to said body to withdraw gases from the bath through said at least a portion of the body.

2. Float glass manufacturing apparatus comprising a tank structure containing a molten metal bath over which a protective atmosphere is maintained, means for advancing a ribbon of glass along the bath, a removable body, at least a portion of which body is of porous non-metallic refractory material and is immersed in the bath alongside the path of travel of the ribbon of glass, and which body is separated from the tank side walls and the tank floor, means for rendering the surface of any exposed portion of said removable body not so immersed and exposed to the atmosphere over the molten metal bath impermeable to said atmosphere, and means for applying suction to said body to extract gases from the bath through said at least a portion of said body.

3. Apparatus according to claim 2, wherein said immersed portion of said removable body is formed as a porous plate, said suction-applying means comprises a suction line and a block of porous non-metallic refractory material cemented to the upper surface of said plate, which block is formed with suction passage means extending therethrough to the interface between the block and the plate, said suction line is connected to the outer end of said suction passage means, and the outer surface of said block is rendered impervious by a glazing coating thereon.

4. Apparatus according to claim 3, wherein said porous plate and porous block are made from porous graphite material having an porosity of 18 to 25 percent with the majority of the pores in the range 2 to 4 microns in diameter, said porosity being open.

5. Apparatus according to claim 3, wherein said porous plate and porous block are made from an aluminosilicate refractory having an porosity of 18 to 28 percent with the majority of the pores in the range 0.2 to 2 microns in diameter, said porosity being open.

6. Apparatus according to claim 2, wherein said immersed portion of the removable porous body is a block of porous non-metallic refractory material formed with a blind bore of stepped diameter having a sunk central part and a wider upper part, said suction applying means comprises a suction pipe one end of which is fixed into the central part of the bore, a sleeve of glazed refractory material is fixed into the wider upper part of the bore, and a seal of melted crushed glass fills substantially the whole interspace between the suction pipe and the sleeve.

7. Apparatus according to claim 6, wherein said porous block is made from porous graphite material having an porosity of 18 to 25 percent with the majority of the pores in the range 2 to 4 microns in diameter, said porosity being open.

8. Apparatus according to claim 6, wherein said porous block is made from an alumino-silicate refractory having an open porosity of 18 to 28 percent with the majority of pores in the range 0.2 to 2 microns.

* * * * *